United States Patent
Watanabe

(10) Patent No.: US 9,098,778 B2
(45) Date of Patent: Aug. 4, 2015

(54) PRINTING DEVICE, METHOD OF OUTPUTTING ERRORS AND METHOD OF EXECUTING PROCESSES THEREOF

(71) Applicant: SEIKO EPSON CORPORATION, Tokyo (JP)

(72) Inventor: Ikumi Watanabe, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 113 days.

(21) Appl. No.: 13/895,767

(22) Filed: May 16, 2013

(65) Prior Publication Data

US 2013/0307897 A1  Nov. 21, 2013

(30) Foreign Application Priority Data

May 17, 2012 (JP) ................................. 2012-113103

(51) Int. Cl.
*G06K 15/00* (2006.01)
*G06F 3/12* (2006.01)
*B41J 2/175* (2006.01)
*B41J 29/13* (2006.01)
*B41J 29/393* (2006.01)

(52) U.S. Cl.
CPC ............. *G06K 15/00* (2013.01); *B41J 2/17566* (2013.01); *B41J 29/13* (2013.01); *G06F 3/1296* (2013.01); *B41J 29/393* (2013.01)

(58) Field of Classification Search
CPC ....................................................... B41J 29/46
USPC ............................................................. 399/81
See application file for complete search history.

(56) References Cited

U.S. PATENT DOCUMENTS

| 6,443,645 B1 * | 9/2002 | Takei et al. ................... 400/621 |
| 6,783,231 B1 * | 8/2004 | Kim .............................. 347/108 |
| 7,869,063 B2 * | 1/2011 | Fukano .......................... 358/1.1 |

FOREIGN PATENT DOCUMENTS

JP   2001-162820 A   6/2001

* cited by examiner

*Primary Examiner* — Stephen Meier
*Assistant Examiner* — Renee I Wilson
(74) *Attorney, Agent, or Firm* — Global IP Counselors, LLP

(57) ABSTRACT

To prevent a user from their confusion when a cover mounted on a case is opened, when a cover mounted on a case is opened, in a case that a condition of an inkjet printer is a detection state that performs detection of an ink remaining amount by an ink sensor, a cover open error is outputted to a display part. On the other hand, in a case that the condition of the inkjet printer is not a detection state, the cover open error is not outputted to the display part.

6 Claims, 3 Drawing Sheets

PRINTING DEVICE, METHOD OF OUTPUTTING ERRORS AND METHOD OF EXECUTING PROCESSES THEREOF

CROSS-REFERENCE TO RELATED APPLICATIONS

This application claims priority to Japanese Patent Application No. 2012-113103 filed on May 17, 2012. The entire disclosure of Japanese Patent Application No. 2012-113103 is hereby incorporated herein by reference.

BACKGROUND

1. Technical Field

The present invention relates to a printing device, a method of outputting errors and a method of executing processes thereof.

2. Background Technology

As printing devices in this kind, it is proposed that an ink tank that stores ink, a print head that discharges ink, which is supplied from the ink tank, on a paper, a carriage, on which the ink tank and the print head are mounted, that moves in a main scanning direction, and a reflective photosensor having a light emitting device and a light receiving device that is provided in a central part of a scanning region of the carriage or in vicinity of the edge part opposed to a home position, are provided thereof (for example, see Patent Document 1). In these devices, when the ink tank faces the reflective photosensor during scanning of the carriage such as during executing printing processes, light is emitted from the light emitting device to the ink tank and the existence or non-existence information of the ink tank is detected by whether or not the reflected light is received by the light receiving device, or when the reflected light is received by the light receiving device, the tank information (ink concentration or ink capacity, ink color, and the like) or the ink remaining amount are detected by the received light signal.

Japanese Laid-open Patent Publication No. 2001-162820 (Patent Document 1) is an example of the related art.

SUMMARY

Problems to be Solved by the Invention

In the above described printing devices, when the information related to the ink tank (information of the existence or non-existence of the ink tank or tank information, ink remaining amount) is detected by the reflective photosensor, if the cover mounted in the case is opened, there can be a risk for a false detect of information by the effect of ambient light. Thus, it can be thought of doing something that needs to be responded to when the cover is opened. However, even though the printing device is in such state, if the correspondences are uniformly performed, a user can be confused in some conditions of the printing device.

A primary advantage of the invention is to provide a printing device, a method of outputting errors and a method of executing processes thereof that prevent a user from their confusion when a cover mounted in a case is opened.

To achieve the above described primary advantage, the printing device, the method of outputting errors and the method of executing processes thereof in the invention provide the following means.

Means Used to Solve the Above-Mentioned Problems

A first printing device of the present invention having a case that stores a reciprocable carriage on which ink cartridge and print head are mounted, a printing unit that prints an image on a medium by discharging ink, which is stored in the ink cartridge, from the print head, and an ink information detection unit that detects ink information related to the ink in the ink cartridge by emitting light to the ink cartridge from a light emitting element and receiving reflected light in a light receiving element, comprises an error output unit that controls whether or not a cover open error is outputted as an error related to a cover being opened in response to a state of the printing device when the cover mounted in the case is opened; wherein at least when the ink information detection is performed by the ink information detection unit, the error output unit outputs a cover open error when the cover is opened.

When the cover mounted in the case is opened, the first printing device of the present invention controls whether or not the cover open error is outputted as an error related to the cover being opened in response to a state of the printing device. Because of this, it is possible to prevent a user from their confusion when the cover is opened compare to performing uniform correspondence. At least, when the cover is opened in a case that the ink information detection is performed by the ink information detection unit, the cover open error is outputted. In this way, a user can be subsequently announced (urged) not to open the cover in the identical circumstance, and a risk for generating number of false detections of ink information by the ink information detection unit can be suppressed. By the way, regarding the ink information in this time, it is preferable to perform correspondence such as masking (ignoring), and the like. Here, as the "ink information", there are an ink remaining amount, existence and non-existence of the ink cartridge, information related to the ink (ink concentration or ink capacity, ink color, and the like), and the like (hereinafter, the same).

In the first printing device of the present invention, it may be possible that the error output unit does not output the cover open error at least during the replacement of the ink cartridge or during paper jam error. Because of this, when the cover is opened due to the replacement of the ink cartridge or the release for the paper jam error, it is possible to prevent a user from their confusion. In this case, it may be possible that the error output unit outputs the cover open error in a case that the cover is opened at least during printing an image by the printing unit, initializing the printing unit, or after the cover was opened and closed due to the replacement of the ink cartridge.

Also, the first printing device of the present invention may have a process executing unit that interrupts executing processes when the cover is opened and the cover open error is outputted, and the process executing unit continues executing processes when the cover open error is not outputted.

A second printing device of the present invention having a case that stores a reciprocable carriage on which an ink cartridge and a print head are mounted, a printing unit that prints an image on a medium by discharging ink, which is stored in the ink cartridge, from the print head, and an ink information detection unit that detects ink information related to the ink in the ink cartridge by emitting light to the ink cartridge from a light emitting element and receiving reflected light in a light receiving element, comprises a process executing unit that controls whether or not executing processes are interrupted or continued in response to a condition of the printing device when a cover mounted in the case is opened; wherein the process executing unit interrupts executing processes in a case that the cover is opened, at least, when the ink information detection is performed by the ink information detection unit.

When the cover mounted in the case is opened, the second printing device of the present invention controls whether or not the executing processes are interrupted or continued in response to a condition of the printing device. Because of this, it is possible to prevent a user from their confusion when the cover is opened compare to performing uniform correspondence. In a case that the cover is opened at least when the ink information detection is performed by the ink information detection unit, the executing processes are interrupted. Thus, the ink information having a risk for a false detection detected by the ink information detection unit can be interrupted. By the way, in this time, since the ink information may have a risk for a false detection, it is preferable to perform correspondence such as masking (ignoring), and the like.

In the second printing device of the present invention, it may be possible that the process executing unit continues executing processes when the cover is opened at least during the replacement of the ink cartridge. Also, it may be possible that the process executing unit interrupts executing processes when the cover is opened at least during printing an image by the printing unit or after the cover was opened and closed due to the replacement of the ink cartridge.

A method for outputting errors in a printing device of the present invention that comprises a case that stores a reciprocable carriage on which an ink cartridge and a print head are mounted, a printing unit that prints an image on a medium by discharging ink, which is stored in the ink cartridge, from the print head, and an ink information detection unit that detects ink information related to the ink in the ink cartridge by emitting light to the ink cartridge from a light emitting element and receiving reflected light in a light receiving element, and the method comprises: a step to control whether or not a cover open error is outputted as an error related to the cover being opened in response to a state of the printing device when the cover mounted in the case is opened; wherein the step includes outputting the cover open error in a case that the cover is opened at least when the ink information detection is performed by the ink information detection unit.

When the cover mounted in the case is opened, the method for outputting errors in the printing device of the present invention controls whether or not the cover open error is outputted as an error related to the cover being opened in response to a condition of the printing device. Because of this, it is possible to prevent a user from their confusion when the cover is opened compare to performing uniform correspondence. In a case that the cover is opened at least when the detection of the ink information is performed by the ink information detection unit, the cover open error is outputted. In this way, a user can be subsequently announced (urged) not to open the cover in the identical circumstance, and a risk for generating number of false detections of ink information by the ink information detection unit can be suppressed. By the way, regarding the ink information in this time, it is preferable to perform correspondence such as masking (ignoring), and the like.

A method for executing processes in a printing device of the present invention that comprises a case that stores a reciprocable carriage on which an ink cartridge and a print head are mounted, a printing unit that prints an image on a medium by discharging ink, which is stored in the ink cartridge, from the print head, and an ink information detection unit that detects ink information related to the ink in the ink cartridge by emitting light to the ink cartridges from a light emitting element and receiving reflected light in a light receiving element, and the method comprises: a step to control whether executing processes are interrupted or continued in response to a condition of the printing device when that a cover mounted in the case is opened; wherein the step includes interrupting executing processes in a case that the cover is opened at least when the ink information detection is performed by the ink information detection unit.

In the method of executing processes in the printing device of the present invention, when the cover mounted in the case is opened, it controls whether executing processes are interrupted or continued in response to a state of the printing device. Because of this, it is possible to prevent a user from their confusion when the cover is opened compare to performing uniform correspondence. In a case that the cover is opened at least when the ink information detection is performed by the ink information detection unit, the executing processes are interrupted. Thus, the ink information having a risk of false detection detected by the ink information detection unit can be interrupted. By the way, in this time, since the ink information may have a risk of false detection, it is preferable to perform correspondence such as masking (ignoring), and the like.

BRIEF DESCRIPTION OF THE DRAWINGS

Referring now to the attached drawings which form a part of this original disclosure.

DETAILED DESCRIPTION OF EXEMPLARY EMBODIMENTS

Figure 1:
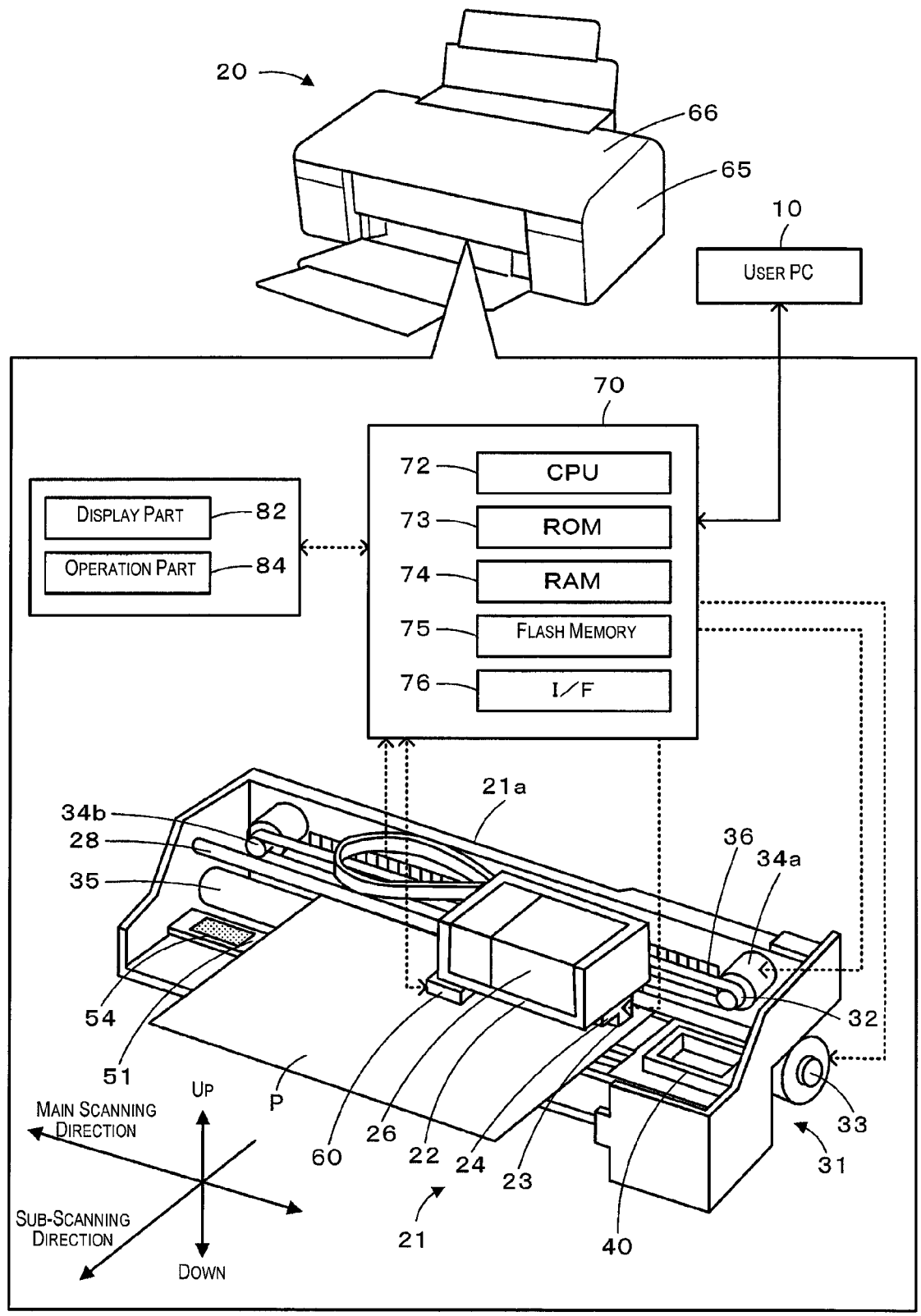
FIG. 1 is a configuration diagram showing schematic configuration of an inkjet printer 20.
Figure 2:
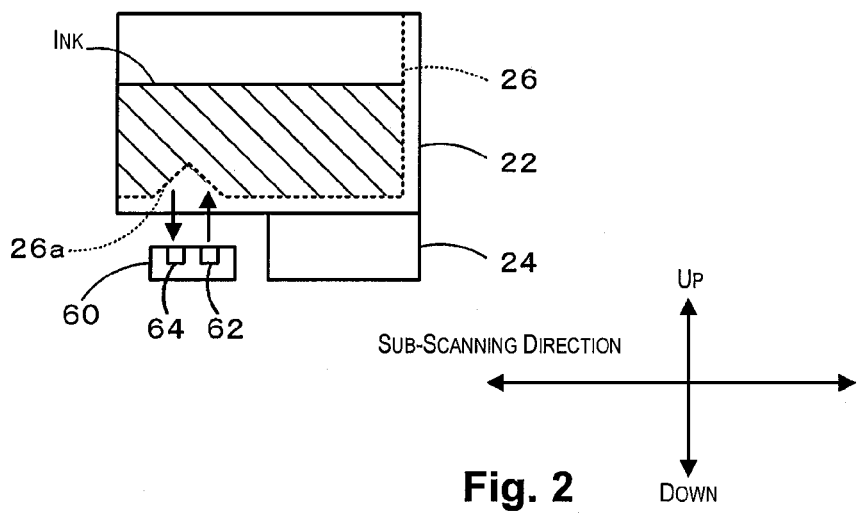
FIG. 2 is an explanatory diagram showing an arrangement of an ink sensor 60 in a positional relationship with a carriage 22.
Figure 3:
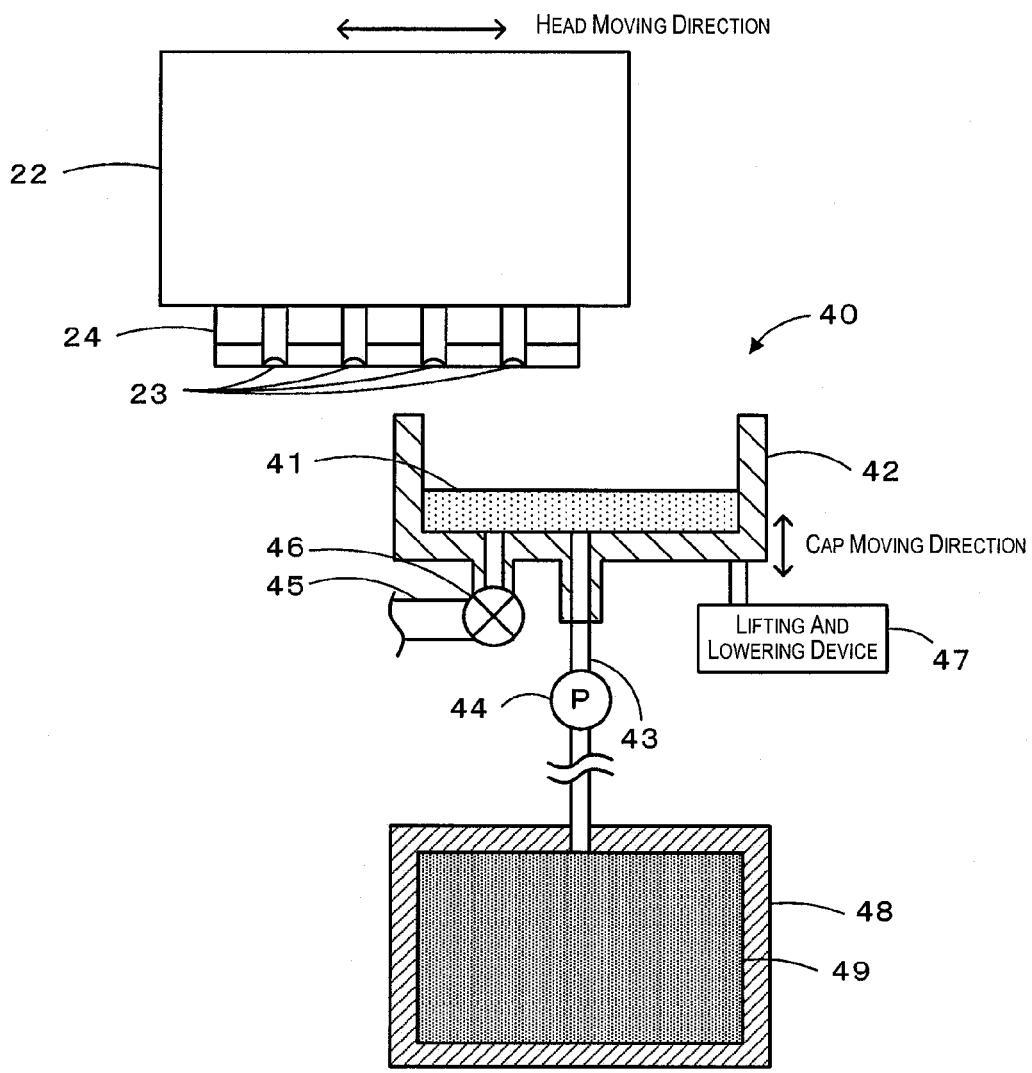
FIG. 3 is a configuration diagram showing schematic configurations of a capping device 40 and a waste tank 48.
Figure 4:
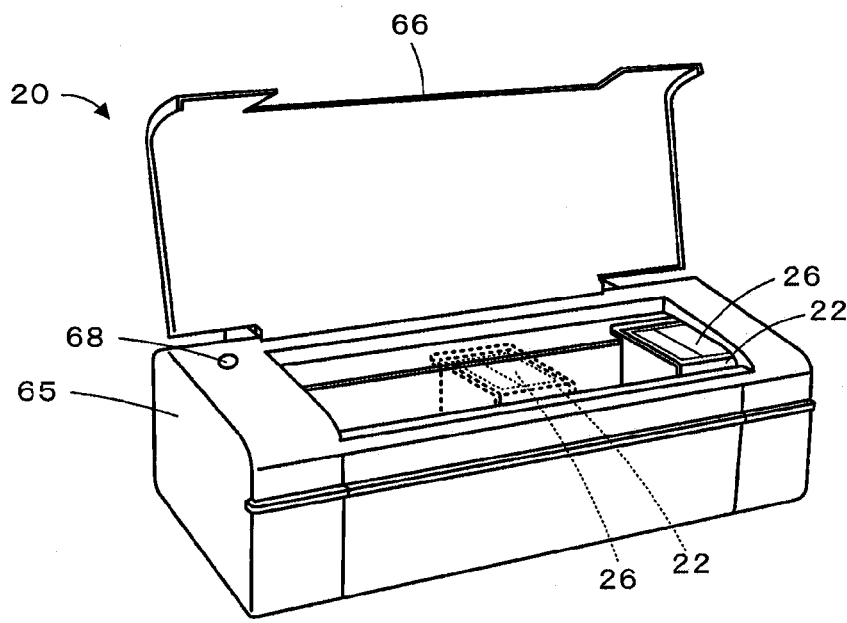
FIG. 4 is an external view showing an appearance in a condition that a cover is opened.

Next, embodiments of the invention will be explained in reference to the drawings. FIG. 1 is a configuration diagram showing schematic configuration of an inkjet printer 20 according to one embodiment of the invention. FIG. 2 is an explanatory diagram showing an arrangement of an ink sensor 60 in a positional relationship with a carriage 22. FIG. 3 is a configuration diagram showing schematic configurations of a capping device 40 and a waste tank 48. FIG. 4 is an external view showing an appearance in a condition that a cover is opened.

As shown in FIG. 1, the inkjet printer 20 of the present embodiment has a paper feeding mechanism 31 that feeds a paper P in a sub-scanning direction (a direction from the front to the back in the drawing) by a paper feeding roller 35 driven by a paper feeding motor 33, a printer mechanism 21 that performs printing to the paper P, which is fed on a platen 51 by the paper feeding mechanism 31, by discharging ink droplets from nozzles 23 formed in a print head 24 in accordance with a movement in a main scanning direction (left and right direction in the drawing), and a controller 70 that controls entire device. In the vicinity of the right end of the platen 51 in the drawing, a capping device 40 is provided to seal a nozzle surface of the print head 24 so as to prevent the nozzles 23 of the print head 24 from drying while the printing stops. In the vicinity of the left end of the platen 51, a flushing region 54 is provided to perform flushing to discharge ink droplets from the nozzles of the print head 24 periodically so as to prevent the nozzles 23 from clogging. By the way, the upper position of the capping device 40 is called as a home position. The inkjet printer 20 of the present embodiment is usable for a plurality of different size papers such as an A4 paper, an A5 paper, a post card, a Legal size paper, and the like, as the papers P, and regardless the sizes, these papers P are fed (conveyed) in a center of a paper as a standard, which is called as a center paper feeding.

The printer mechanism 21 has a carriage motor 34a provided in the right end of a mechanical frame 21a in the drawing, a driven roller 34b provided in the left end of the mechanical frame 21a, a carriage belt 32 installed with the carriage motor 34a and the driven roller 34b, a carriage 22 that is reciprocated in a main scanning direction along a guide 28 by a carriage belt 32 in accordance with a drive of the carriage motor 34a, an ink cartridge 26 that is mounted on the carriage 22 and individually stores each color ink of CMYK cyan (C), magenta (M), yellow (Y), black (K) included with colorant or pigment to water as a solvent, a print head 24 that discharge ink droplets from a plurality of nozzles 23 by receiving the supply of ink from the cartridge 26, and an ink sensor 60 that detects ink information such as ink remaining amount, and the like of the ink cartridge 26 fixed on a fixed member, not shown in the drawing, extending from the mechanical frame 21a. By the way, a linear encoder 36 is provided to output a pulsed signal in accordance with a movement of the carriage 22 so that a position of the carriage 22 is controlled by the linear encoder 36.

As shown in FIG. 1, the ink sensor 60 is arranged substantially at a center of the paper P in the main scanning direction. As described above, regardless the sizes, the paper P is fed in a center paper feeding. Also, as shown in FIG. 2, the ink sensor 60 is arranged below the ink cartridge 26. Here, the ink sensor 60 has a light emitting element 62 to emit light upwardly, and a light receiving element 64 to receive light from the upper side. The ink sensor 60 has a configuration as a reflective photoelectric sensor to output an electric signal to be converted to a voltage, which has a size in response to the amount of light received in the light receiving element 64. On the other hand, the ink cartridge 26 is formed by a light transmissive synthetic resin material, and the like, and in the below surface, the cross-section forms a triangle-shaped recess part 26a. And, in a case that the carriage 22 moves the substantial central part of the paper P during the printing, and the like, when the ink sensor 60 is opposed to the recess part 26a of the ink cartridge 26, the light receiving element 64 can receive the light, which is emitted from the light emitting element 62 and is reflected in the recess part 26a (inclined surface of the hollow part 26a) of the ink cartridge 26. The light reflected in the recess part 26a of the ink cartridge 26 is also changed by refraction index of the synthetic resin material, an incoming angle of the light, and not only the inclined angle but also ink remaining amount. The detail will be omitted, but for example, when the ink remaining amount is enough, most of the reflected light is transmitted through the ink cartridge 26 from the recess part 26a and the reflected light is reduced. Also, in a subsequent case that the liquid level reaches the recess part 26a when the ink remaining amount is reduced, as the liquid level is lowered due to the reduction of the ink remaining amount, the amount of light that transmits through inside of the ink cartridge 26 reduces and the reflected light increases. Because of this, the amount of light reflected in the recess part 26a is changed in response to the ink remaining amount so that the light receiving amount of the light receiving element 64 is also changed. Therefore, the ink sensor 60 outputs an electric signal in response to the ink remaining amount of the ink cartridge 26 in each color by receiving the reflection of light, which was emitted from the light emitting element 62, in the light receiving element 64 when the carriage 22 passes through the substantial center part of the paper P.

As shown in FIG. 3, the capping device 40 is provided with a substantially rectangular parallelepiped cap 42 having opening in upper side in which a sponge 41 is provided to absorb ink in the inside part, a suction pump 44 attached with an elasticized tube 43 connected to the bottom part of the cap 42, an air release valve 46 attached with a elasticized tube 45 connected to the bottom part of the cap 42, and a lifting and lowering device 47 that lifts and lowers the cap 42 to perform contacting and its releasing between the cap 42 and the print head 24. The capping device 40 executes cleaning in a condition that the print head 24 is moved in a position above the capping device 40 (home position), and it is used to control increasing viscosity (drying) of ink in the nozzles 23 by sealing a nozzle forming surface of the print head 24 while the printing stops. In the cleaning, the nozzle forming surface of the print head 24, which is moved to the home position, is sealed by the cap 42, which is lifted by the lifting and lowering device 47. The suction pump 44 is driven in a condition that the air release valve 46 is closed. The internal space formed by the print head 24 and the cap 42 becomes negative pressure so that the ink in the inside of the nozzles 23 is forcibly vacuumed. At this time, among the vacuumed ink, the ink absorbed in the sponge 41 moisturizes inside of the cap 42, and the ink that does not absorbed in the sponge 41 discharges to a waste tank 48 in accordance with driving the suction pump 44. Also, as timing for executing the cleaning, it would be immediately after the replacement of the ink cartridge 26 was completed, or a user commands cleaning by controlling the operation part 84.

As shown in FIG. 2, in the waste tank 48, the tube 43 is connected to the upper surface, and a waste fluid pad 49 that is absorbable for ink (waste fluid) in the inner part, is filled. The waste tank 48 absorbs the ink, which is vacuumed by the suction pump 44 and is discharged through the tube 43, in the waste fluid pad 49 and stores it. The waste fluid pad 49 can absorb a predetermined amount of ink, and if the predetermined amount is reached, it is necessary to be replaced. Also, the determination whether or not the waste fluid pad 49 reaches the predetermined amount is performed by a controller 70. In this determination, for example, ink amount discharged to the waste tank 48 in accordance with the execution of the cleaning is preliminary defined by the experimentation, and the like. It is performed by comparing a cumulative absorbed amount, which cumulates the absorbed amount of the waste fluid pad 49 calculated by multiplying the ink amount and the number of cleanings, and the predetermined amount of the waste fluid pad 49.

As shown in FIG. 1, the controller 70 is configured as a microprocessor center on a CPU 72, and it has a ROM 73 that stores various processing programs or various data, a RAM 74 that stores data temporarily, a flash memory 75 that is writable and erasable data, an interface (I/F) 76 that communicates information with external devices, and an input-output port that is not shown in the drawing. The RAM 74 is provided with a print buffer region, and a print job, which is sent from a user PC 10 as a general-purpose personal computer through the I/F 76 to the print buffer region, is stored. In the controller 70, a position signal from the linear encoder 36 or an electric signal from the ink sensor 60, an open/close condition detection signal from an open/close condition detection sensor 68 (see FIG. 4) that detects whether the cover 66 is opened or closed, a control signal from the operation part 84 of the control panel 80, and the like are inputted through the input port, and also, a print job, and the like are inputted through the I/F 76. Also, a drive signal to the print head 24 or a drive signal to the paper feeding motor 33, a drive signal to the carriage motor 34*a*, a control signal to the suction pump 44 or the lifting and lowering device 47 of the capping device 40, a display command signal to a display part 82 of the control panel 80, and the like are outputted from the controller 70 through the output port, and also, the print status information, and the like is outputted to the user PC 10 through the I/F 76.

As shown in FIG. 4, the inkjet printer 20 of the present embodiment opens the upper surface in a condition that the cover mounted in the case 65 is opened. In the drawing, the solid line of the carriage 22 (ink cartridge 26) indicates that a position of the carriage 22 is in a home position, and the broken line of the carriage 22 (ink cartridge 26) indicates a position for ink replacement where the ink cartridge 26 is installed or replaced in the position of the carriage 22. In the embodiment, when the cover 66 is opened in a condition that the ink cartridge 26 is out of ink and the information is displayed in the display part 82, or when the cover is opened in a condition that a user instructs the ink replacement controlled by the operation part 84 (the cover 26 is opened due to the replacement of the ink cartridge 26), the carriage 22 is moved to a position for ink replacement. Also, after the cover 66 is closed, the ink remaining amount is detected by the ink sensor 60 in accordance with the movement of the carriage 22 and the carriage 22 is moved to the home position.

Also, in the inkjet printer 20 of the present embodiment, when an initialization command of the printer mechanism 21 is executed by the operation part 84 controlled by a user, a determination of a home position of the carriage 22, or a paper ejection of the paper P, a detection of the ink remaining amount by the ink sensor 60 in accordance with the movement of the carriage 22, and the like are performed.

Figure 5:
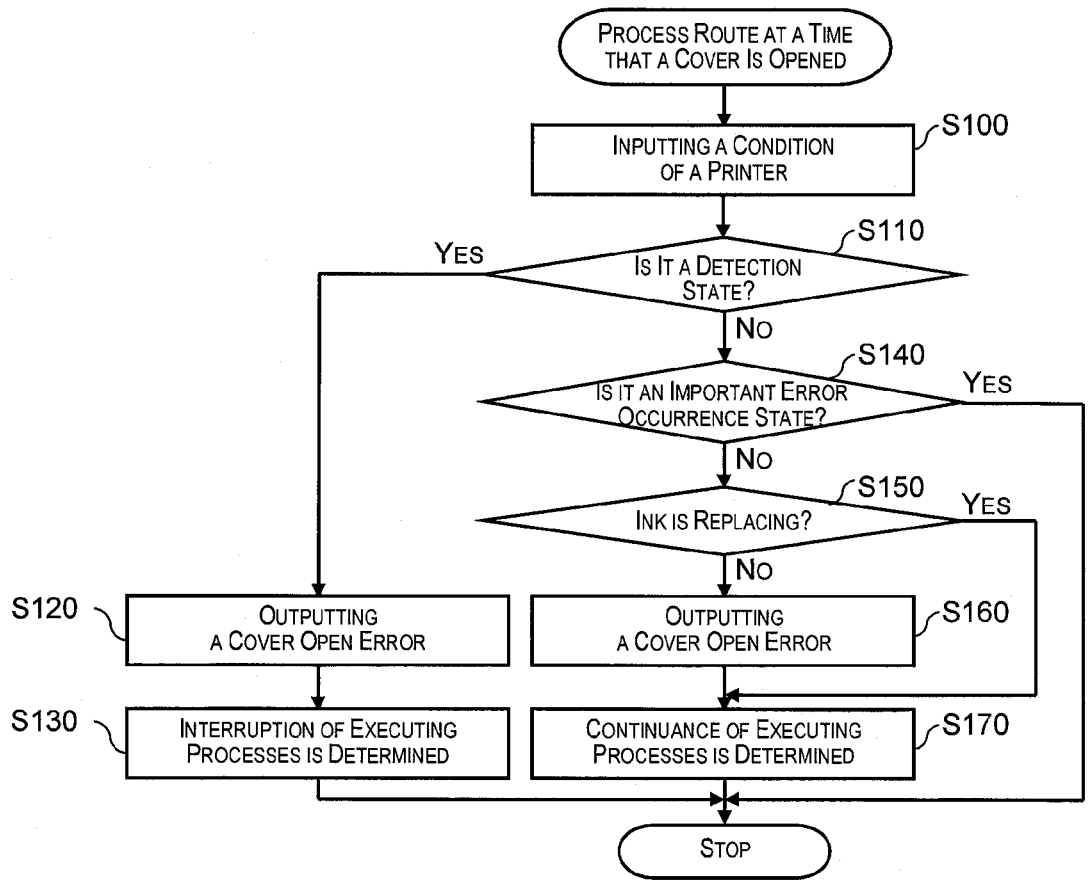
FIG. 5 is a flowchart showing one example of processing routine when the cover is opened.

Next, the operation of the inkjet printer 20 of the present embodiment in this configuration, specifically, the operation when the cover 66 is opened will be explained. FIG. 5 is a flowchart showing one example of a processing routine when the cover is opened which is executed by the controller 70. This routine is executed when the cover is opened (when the open and close condition detection sensor 68 detects that the cover 66 is opened). By the way, when the cover is opened, there can be a risk for false detection of the ink remaining amount by the effect of ambient light when the ink sensor 60 detects the ink remaining amount.

When the processing routine in a condition that the cover is opened is executed, first, the CPU 72 of the controller 70 inputs a condition of the inkjet printer 20 (Step S100). Here, in the embodiment, an idle state, during printing, during executing cleaning, a time between a condition that the cover is opened and a condition that the cover is closed due to the replacement of the ink cartridge 26 (hereafter, it is referred to as during ink replacement), a time between a condition that the cover is opened and closed due to the replacement of the ink cartridge 26 and a condition that the carriage 22 is returned to the home position (hereinafter, it is referred to as during movement after ink replacement), during initialization of the printer mechanism 21, during occurrence of fatal error (this is an error that is required to shut down power due to releasing the error), during occurrence of paper jam error, during occurrence of waste fluid pad error (this is an error that the absorbed amount of the waste fluid pad 48 reached the predetermined amount), and during occurrence of out of paper error are considered as a condition of the inkjet printer 20.

In this way, when a condition of the inkjet printer 20 is inputted, the ink sensor 60 determines whether or not the inputted condition of the inkjet printer 20 is a detection state to perform a detection of the ink remaining amount by the ink sensor 60 (Step S110). Here, in this embodiment, during printing or during movement after ink replacement, and during initialization of the printer mechanism are considered as the detection state.

When it is determined that the condition of the inkjet printer 20 is the detection state, a cover open error, which is an error related to a condition that the cover is opened, is displayed in the display part 82 (Step S120), it is determined that the executing process is interrupted (Step S130), and the present routine is end. Now, it is considered as during printing or during movement after ink replacement, and during initialization of the printer mechanism 21 so that when it is determined that the executing process is interrupted, the controller 70 interrupts the printing process and the detection of the ink remaining amount by the print sensor 60, and moves the carriage 22 to the home position. In this way, by displaying the cover open error in the display part 82, a user can be subsequently announced (urged) that do not open the cover in the identical circumstance, and a risk for generating number of false detections of ink information (ink remaining amount) by the ink sensor 60 can be suppressed. Also, by interrupting the printing process or the detection of the ink remaining amount by the ink sensor 60, it can avoid to continue detecting the information that can include a risk for false detection. By the way, regarding the detected information, it is preferable to mask (it is not written in the RAM 74 or the flash memory 75) due to a risk for false detections. Also, in a case during the initialization of the printer mechanism 21, processes other than the detection of the ink remaining amount by the ink sensor 60 can be executed.

When it is determined that the condition of the inkjet printer 20 is not the detection state, it determines whether or not an important error, which is more important than the importance of the cover open error, occurs as an important error occurrence state (Step S140). Here, in the embodiment, as the important error occurrence state, the occurrences of a fatal error, a paper jam error, and a waste fluid pad error can be considered. By the way, normally, it can be considered that there are no executing processes in this time.

When it is determined that the condition of the inkjet printer 20 is the important error occurrence state, the present routine is directly end. In this case, the cover open error is not displayed in the display part 82. Because of this, it can be avoided to give an impression to a user (to confuse a user) such that the cover open error occurs in this state. By the way, in the embodiment, the current occurrence error is displayed in the display part 82.

When it is determined that the condition of the inkjet printer 20 is not the important error occurrence state, it determines whether or not it is during the ink replacement (Step S150). When it is determined as during the ink replacement, the cover open error is not displayed in the display part 82, and it determines to continue the executing processes (Step S170). The present routine is end. Now, it is considered as during the ink replacement so that the executing process (process that the carriage 22 is moved from the home position to the ink replacement position) continues for a user to perform installing or replacing the ink cartridge 26. In this case, it can be avoided to give an impression to a user (to confuse a user) such that the cover open error occurs during the ink replacement, and also, it can be avoided to confuse a user by that the carriage 22 does not move to the ink replacement position.

When it is determined that the condition of the inkjet printer 20 is not during the ink replacement (in the embodiment, in a case that the condition is an idle state, during executing cleaning, or during occurrence of out of paper error), the cover open error is displayed in the display device 82 (Step S160), and it determines to continue the executing processes (Step S170). And, the present routine is end. When it is the idle state or during executing cleaning, it does not detect the ink remaining amount by the ink sensor 60 so that there is no risk for a false detection, but by displaying the cover open error in the display device 82, a user can be announced (urged) not to open the cover 66 if it is possible. Also, in this case, there is no risk for the false detection of the ink remaining amount by the ink sensor 60 so that for the executing processes, it continues executing the processes. By the way, in a case of the idle state or during occurrence of out of paper error, it can be considered that there are no executing processes.

Here, the constituent elements of the invention and the correspondence relationship of the constituent elements of the invention will be clarified. The printer mechanism 21 of the present embodiment corresponds to the printing unit of the invention, the ink sensor 60 corresponds to "ink information detection unit", and the controller 70 that executes processes of Steps S100 to S120 and S140 to S160 corresponds to "error output unit". Also, the controller 70 that executes processes of Steps S100, S110, S130 to S150, and S170 corresponds to "process executing unit". By the way, in the present embodiment, by explaining the operations of the printing device, one example of the method of outputting errors or the method of executing processes is also clarified.

According to the inkjet printer 20 of the present embodiment as described above, in a case that the cover 66 is opened when the condition of the inkjet printer 20 is a detection state to perform the detection of the ink remaining amount by the ink sensor 60, the cover open error as an error related to the cover being opened is outputted to the display part 82. Therefore, a user can be subsequently announced (urged) not to open the cover 66 in the identical circumstance, and a risk for generating number of false detections of ink information by the ink sensor 60 can be suppressed. Also, in a case that the cover is opened when the condition of the inkjet printer 20 is not a detection state, basically, the cover open error is not outputted to the display part 82. Therefore, it is possible to prevent a user from their confusion when the cover is opened due to the replacement of the ink cartridge 26 or releasing the paper jam error, and the like.

Also, according to the inkjet printer 20 of the embodiment, in a case that the cover is opened when the condition of the inkjet printer 20 is a detection state, the executing processes are interrupted, and when it is not a detection state, the executing processes are continued. With the former case, it can interrupt to detect the information (ink remaining amount) that can be a risk for a false detection. With the latter case, for example, when the cover is opened due to the replacement of the ink cartridge 26, the carriage 22 moves to a position for the replacement of the ink cartridge 26. Therefore, it is possible to prevent a user from their confusion.

By the way, the invention is not limited to any embodiments described above, and without any implication, it should be practicable in various aspects as long as it belongs to the technical scope of the invention.

In the embodiment described above, among the cases that the condition of the inkjet printer 20 is not a detection state, when it is not the important error occurrence state or during the ink replacement (in a case of idle state, during executing cleaning, or during occurrence of out of paper error), the cover open error is displayed in the display part 82. However, it can not be displayed because there is no risk for a false detection by the ink sensor 60.

In the embodiment described above, a detection state was considered during printing or during the movement after the replacement of the ink, and during the initialization of the printer mechanism 21, but other than these conditions, a condition that the ink remaining amount is detected by the ink sensor 60 can be included in the detection state. In at least one of these conditions, if the ink remaining amount is not detected by the ink sensor 60, it can be excluded from the detection state.

In the embodiment described above, the important error occurrence state was considered in the occurrences of the fatal error or the paper jam error, but it can be considered in a part of these errors, or it can be considered in other errors in addition to these errors.

In the embodiment described above, when the condition of the inkjet printer 20 is the detection state, the cover open error was displayed in the display part 82, and the executing processes were interrupted, but it can perform either one of them.

In the embodiment described above, when the cover open error is outputted, the error was displayed in the display part 82. However, an audio output from a speaker, which is not shown in the drawing, can be used instead of the display part or in addition to the display part.

In the embodiment described above, it was described after the factory shipment (after the cover 66 was mounted in the case 65), but at the time of startup in a condition that the cover 66 is not mounted on the case 65 in the manufacturing process, there is no sense to output an error so that the cover open error can not be outputted.

In the embodiment described above, the ink remaining amount of the ink cartridge 26 was detected by the ink sensor 60, but it is not limited to this. The detection can be whether or not the ink cartridge 26 is installed, or the detection can be information related to the ink (ink concentration or ink capacity, ink color, and the like). Whether or not the ink cartridge 26 is installed can be determined by whether or not the light, which is emitted from the light emitting element 62 to the ink cartridge 26, is received in the light receiving element 64. An identifier such as bar-code (stripe pattern of white and black), and the like indicating information related to the ink is provided so that the information related to the ink can be detected by emitting light from the light emitting element 62 to the identifier and receiving the reflected light in the light receiving element 64.

In the embodiment described above, the invention is applied to the inkjet printer 20 for the explanation, but it can be applied to a facsimile device, a compound device, and the like.

What is claimed is:

1. A printing device comprising:
   a case;
   a carriage arranged movably relative to a sheet inside of the casing, the carriage including a print head and an ink cartridge that are mounted to the carriage;
   an ink sensor arranged facing the ink cartridge mounted to the carriage, the ink sensor being configured to detect an ink remaining amount;
   a cover that is mounted on the case;
   a state determination unit configured to determine a state of the printing device when the cover is opened;
   a detection state determination unit configured to determine, based on the state of the printing device, whether or not the printing device is in a detection state in which the ink remaining amount is detected;

an error determination unit configured to determine whether or not a cover open error as an error related to the cover that has been opened is output;

an interrupt determination unit configured to output to a display unit the cover open error as the error related to the cover that has been opened and determine whether or not an executing process is interrupted when the state of the printing device is determined to be the detection state in which the ink remaining amount is detected; and a determination unit configured to determine whether or not at least one of a fatal error and a paper jam error occurs when the state of the printing device is not determined to be the detection state in which the ink remaining amount is detected;

when determining that the at least one of the fatal error and the paper jam error occurs, the determination unit being configured to determine the at least one of the fatal error and the paper jam error as an important error, and configured not to perform displaying on the display unit.

2. The printing device according to claim 1, wherein the detection state in which the ink remaining amount is detected is a least one of a printing state, a moving state of the carriage after the ink cartridge is replaced, and an initializing state of the printing device.

3. The printing device according to claim 2, wherein when the executing process is interrupted, detecting of the ink remaining amount is interrupted and the carriage moves to a predetermined position.

4. The printing device according to claim 1, wherein when the determination unit determines that the at least one of the fatal error and the paper jam error does not occur, whether or not the ink cartridge is being replaced is determined, and when the ink cartridge is being replaced, the executing process is continued without displaying of the cover open error.

5. The printing device according to claim 4, wherein when the ink cartridge is not being replaced, the cover open error is displayed on the display unit and the executing process is continued.

6. The printing device according to claim 1, wherein the determination unit is further configured to perform a determination of a waste fluid pad error.

* * * * *